United States Patent
Garrido et al.

(10) Patent No.: US 7,070,155 B2
(45) Date of Patent: Jul. 4, 2006

(54) POWER SEAT DRIVE MOTOR MOUNTING ARRANGEMENT AND ASSEMBLY METHOD

(75) Inventors: Pascal E. Garrido, Kilworthy (CA); Brent Hauck, Huntsville (CA); Brian Moore, Bracebridge (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/298,186

(22) Filed: Nov. 15, 2002

(65) Prior Publication Data

US 2004/0094683 A1 May 20, 2004

(51) Int. Cl.
*F16M 13/00* (2006.01)

(52) U.S. Cl. ........................... 248/424; 248/429

(58) Field of Classification Search ........... 74/89.14, 74/425, 424.71, 89.28, 89.32; 248/422, 671, 248/424, 429, 421, 674; 297/330, 344.1; 296/65.15, 65.13, 65.14

See application file for complete search history.

(56) References Cited

U.S. PATENT DOCUMENTS

| | | | | | |
|---|---|---|---|---|---|
| 5,275,457 | A | * | 1/1994 | Satoh et al. | 296/65.15 |
| 5,316,258 | A | * | 5/1994 | Gauger et al. | 248/548 |
| 5,487,520 | A | * | 1/1996 | Mouri et al. | 248/429 |
| 5,797,576 | A | * | 8/1998 | Gauger | 248/429 |
| 5,823,499 | A | * | 10/1998 | Ito et al. | 248/429 |
| 6,305,658 | B1 | * | 10/2001 | Kita | 248/424 |
| 6,309,019 | B1 | * | 10/2001 | Downey et al. | 297/344.1 |
| 6,729,598 | B1 | * | 5/2004 | Folliot et al. | 248/671 |

FOREIGN PATENT DOCUMENTS

JP 07315086 * 12/1995

* cited by examiner

*Primary Examiner*—Gwendolyn Baxter
(74) *Attorney, Agent, or Firm*—Jack Benefiel; Dean B. Watson

(57) ABSTRACT

A mounting arrangement and method for a drive motor for power seat slider rail assemblies, in which a bracket extends between a pair of right angle gear units secured to one end of a respective slider rail. The bracket has a longitudinal slot at one end engaging a headed pin on one of the gear units and a transverse slot at the other end snap fit to a headed pin on the other gear unit when the bracket is swung about the first pin and slot connection. The bracket has intermediate structure which engages the drive motor to align the same between the gear units when the bracket is swung into position and prevent rotation of the motor casing. Flexible drive shafts extend from each end of the motor to drive respective gear units.

16 Claims, 4 Drawing Sheets ically used in this application since they allow considerable misalignment between the motor and gear units, but are noisy when operated at the moderately high motor speeds involved, i.e., 3000 rpm, typical for power seat motors. Lubrication must be packed into the casing to reduce cable noise and wear increasing the cost of this type of drive.

POWER SEAT DRIVE MOTOR MOUNTING ARRANGEMENT AND ASSEMBLY METHOD

BACKGROUND OF THE INVENTION

This invention concerns mounting arrangements and methods used in drive motors for automotive power seats of the type in which the seat is mounted on a pair of slide rail assemblies, and a drive motor is disposed therebetween to simultaneously drive a pair of right angle gear units, each mounted to an adjacent end of a respective slide rail. The prior method of assembling these components involved the use of a plurality of brackets individually installed using fasteners to secure the motor in place aligned with the gear units and to be restrained against rotation. Installation of the bracketry and fasteners necessary to maintain the components in accurate alignment has been a labor intensive task, adding to the manufacturing cost.

The drive motor has conventionally been equipped with two flex cables used as drive shafts, one on each end of the motor and driving a respective gear units.

Flex or "Bowden" cables are constructed using a heavy wire or cable core enclosed within a casing, and are widely used in this application since they allow considerable misalignment between the motor and gear units, but are noisy when operated at the moderately high motor speeds involved, i.e., 3000 rpm, typical for power seat motors. Lubrication must be packed into the casing to reduce cable noise and wear increasing the cost of this type of drive.

Flex cables are difficult to assemble since the core must be aligned and mated with a square receptacle in the gear unit while being hidden by the outer casing. In typical power seat installations, a second outer casing tube is often used to confine the flex cables. These assembly complications increase the cost to manufacture and install the power seat.

It is an object of the present invention to provide a simplified mounting arrangement and an assembly method for a power seat drive motor which is quicker and easier to execute.

SUMMARY OF THE INVENTION

The above recited object and other objects of the invention which will become apparent upon a reading of the following specification and claims are achieved by an arrangement including a single elongated bracket which secures the drive motor in alignment with each of the right angle gear units and restrains the motor casing against rotation. The bracket is installed without the use of fasteners by a first slot in an end section at one end of the bracket extending in a lengthwise direction, which is engaged with a headed pin or other mating feature atop one of the gear units, and a second slot at the other end of the bracket extending transversely to the lengthwise direction of the bracket which receives a second headed pin or other feature on the other gear unit.

The gear units have previously been assembled to one end of a respective slide rail assembly, the slide rail assemblies then located parallel to each other and properly spaced apart by location features on an assembly fixture. Drive shafts are installed at either end of the motor which are each mated with a respective gear unit.

The second slot is configured to establish a snap fit with the mated feature. After engaging the first slot at one end of the bracket with the pin on one of the gear units, the bracket is swung around towards the other gear unit of the other slide rail assembly to establish a snap fit engagement with the headed pin or other mating feature on the other gear unit.

As this is done, a pair of spaced apart intermediate features on one side of the bracket also come into contact with the drive motor casing to be engaged therewith so as to align the motor with the gear units, one of these features also restraining rotation of the drive motor casing.

The drive shafts may be comprised of a shaft which is made moderately flexible by a series of slots formed in the periphery thereof so that the flexible drive cables may be eliminated to simplify installation and reduce noise when the motor is operated.

Alternatively, a flexible cable having an outer crimped case can be used.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention concerns an arrangement and method for assembly of a drive motor to power seat mechanisms for automotive vehicles in which a seat is mounted for horizontal adjustment movement on a pair of parallel tracks or slide rail assemblies and are selectively driven along the slide rail assemblies by selectively energizing the electrical drive motor. Advantageously, a single drive motor is conventionally used to simultaneously drive two right angle gear units, each associated with a respective slide rail assembly, by locating the motor between the slide rails and installing two drive shafts extending between a respective end of the motor and each gear unit. This requires alignment of the single motor with both gear units.

The gear units typically each drive a power screw-nut combination to cause horizontal movement of a slide in the slide rail assembly to which the seat is attached to provide the seat fore and aft adjustment.

It has been the practice to install a series of brackets to the motor and slide rails to create a subassembly which can be secured to the automobile floor pan during assembly of the automobile. This bracketry has in the past been installed by means of conventional fasteners and has involved many parts and substantial labor time.

According to the present invention, a much simplified arrangement and method are employed by use of a single bracket quickly installed without the use of fasteners.

Figure 1:
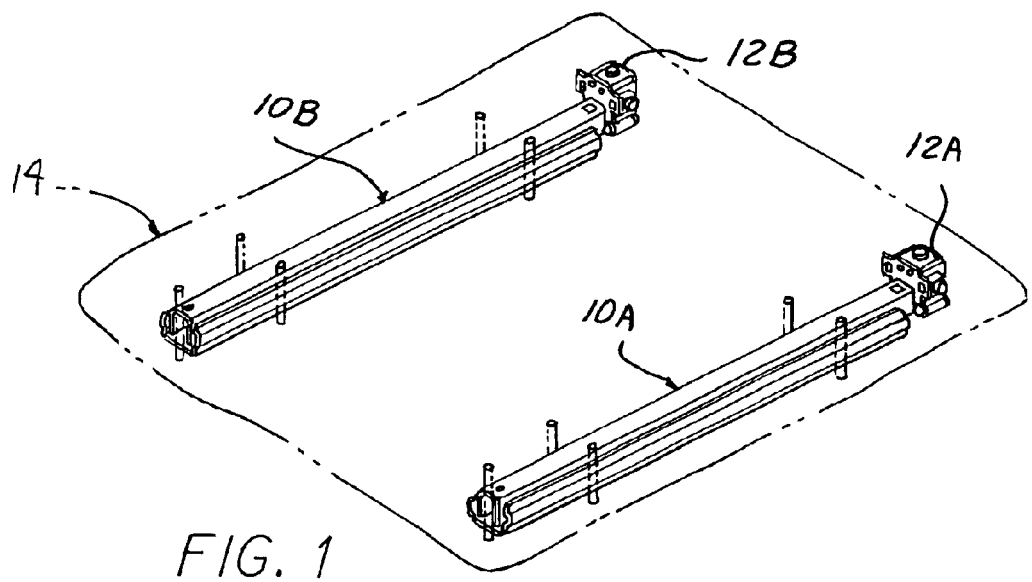
FIG. 1 is a perspective view of a pair of slide rail assemblies located in a parallel position on a fixture shown in phantom lines, each having a right angle gear unit attached to one end.

As shown in FIG. 1, the two slide rail assemblies 10A, 10B have their respective right angle gear units 12A, 12B assembled to one end. These subassemblies are positioned on a fixture 14 locating the same parallel and side by side with respect to each other.

Figure 2:
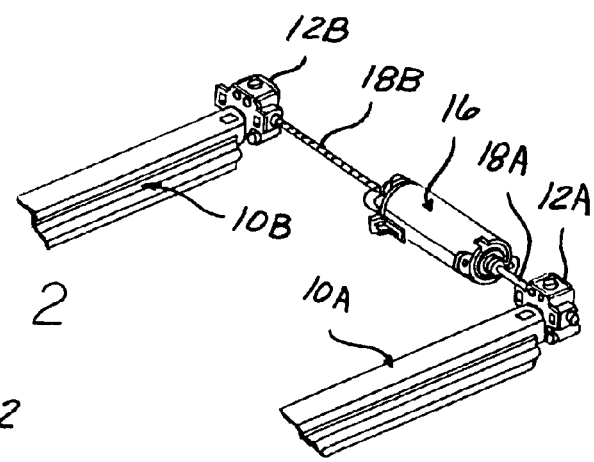
FIG. 2 is a perspective view of the drive motor and drive shafts installed on the gear units and slides shown in FIG. 1.
Figure 4:
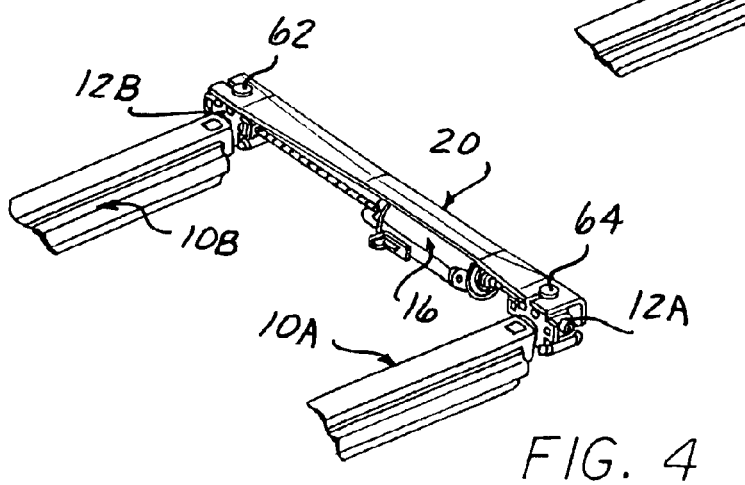
FIG. 4 is a perspective view of the components shown in FIGS. 3 and 3A with the bracket swung around to be snap fit to the other gear unit.

An electrical drive motor 16 has a pair of drive shafts 18A, 18B assembled thereto, drive shaft 18B being much longer than shaft 18A since the motor 16 is closer to one slide rail assembly 10A than the other slide rail assembly 10B. As seen in FIG. 2, the motor 16 and drive shafts 18A, 18B are placed between the slide rails 10A and 10B with the drive shafts 18A, 18B each mated with respective right angle gear units 12A, 12B using with suitable couplings.

A single elongated bracket 20 is fabricated of a length sufficient to connect together the respective gear units 12A, 12B, by spanning the distance therebetween.

Figure 5:
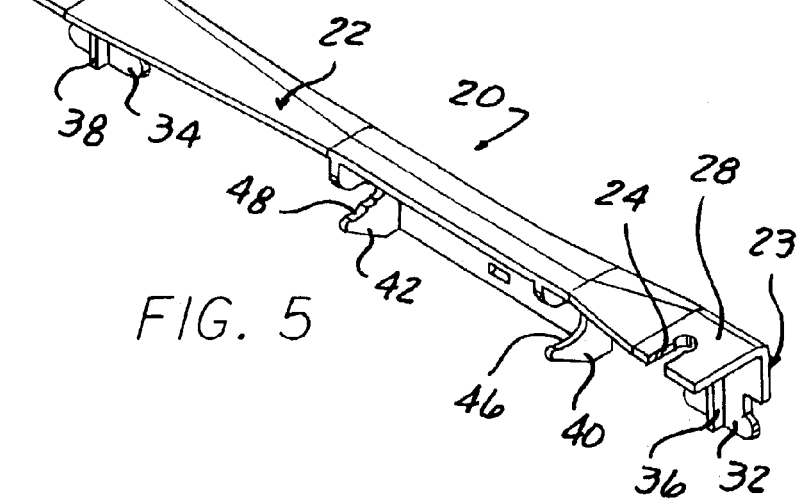
FIG. 5 is an enlarged perspective view of the elongated bracket used in the mounting arrangement and method according to the invention.
Figure 5A:
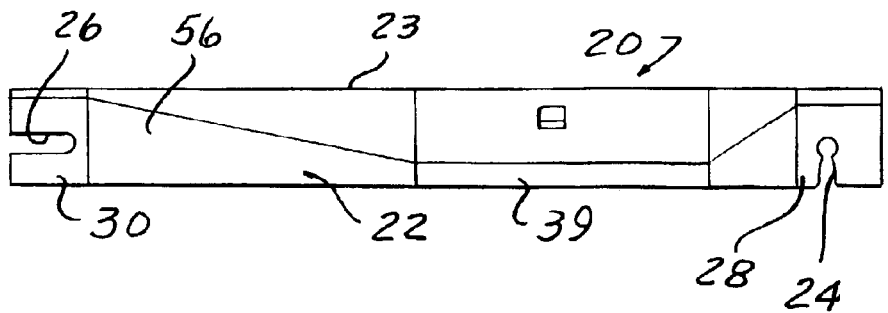
FIG. 5A is a top view of the bracket shown in FIG. 5.

The bracket 20, as best seen in FIG. 5, is generally configured as an angle piece, with a horizontal top wall 22 and a vertical back wall 23 (FIGS. 5 and 5a).

The top wall 22 is formed with an open-ended slot 24 in one end section 28 extending in the longitudinal direction so as to be able to receive a protruding feature comprising a headed pin 62 or other mating feature on gear unit 12B, and an open ended straight slot 26 is formed in the other bracket end section 30. The slot 24 is configured to be able to be snap fit to a second protruding feature comprising a headed pin 64 or other mating feature on the gear unit 12A. Bracket end sections 28 and 30 are disposed to overlie the top of respective right angle gear units 12A, 12B from which the pins 64, 62 project when the bracket 20 is assembled thereto.

Back wall end sections 32, 34 are each formed with stiffener ribs 36, 38 positioned against the respective gear units 12A, 12B.

Figure 4A:
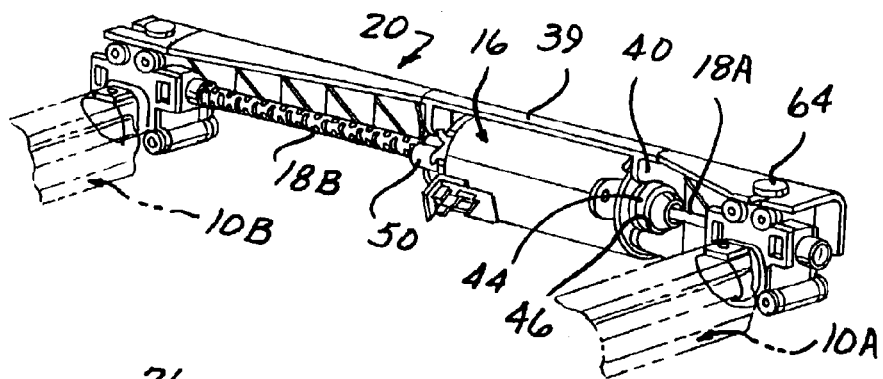
FIG. 4A is an enlarged perspective view of the assembled components shown in FIG. 4.

At an intermediate section 39 along the length of the bracket 20, there are provided a pair of spaced apart flanges 40, 42 integral with both the top and back walls 22, 24 to be quite rigid. Flange 42 has a semicircular snap fit configuration cut out 46 designed to partially encircle a boss 44 on one end of the motor casing (FIG. 4A) to center and axially locate and align the motor 16 with respect to the gear units 12A, 12B.

Flange 42 also has a cut out 48 which is configured to be snap fit to a non-round antirotation feature 50 on the opposite end of the motor casing which also serves to align the motor 16 but additionally prevent rotation of the motor case (FIGS. 3A, 4A) to absorb the reaction when the motor 16 is operated.

The top wall 22 is tapered to be narrower where the motor 16 will be received in order to accommodate the same.

A series of stiffener gussets 58 are arranged along the longer tapered section 56 between the motor section 39 and end section 30.

A punched out opening 60 can be provided for routing electrical cables (not shown) to the motor 16.

Figure 3:
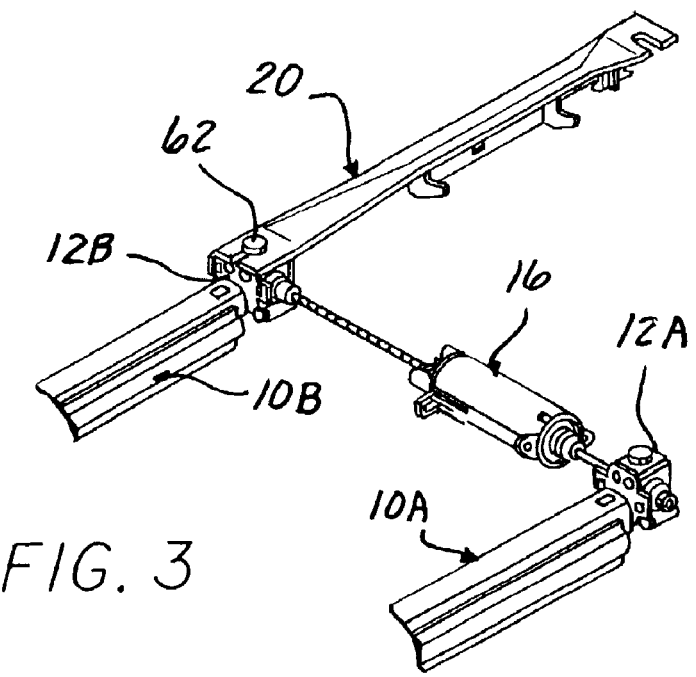
FIG. 3 is a perspective view of a mounting bracket hooked at one end to one of the gear units preparatory to being swung into engagement with the other gear unit.
Figure 3A:
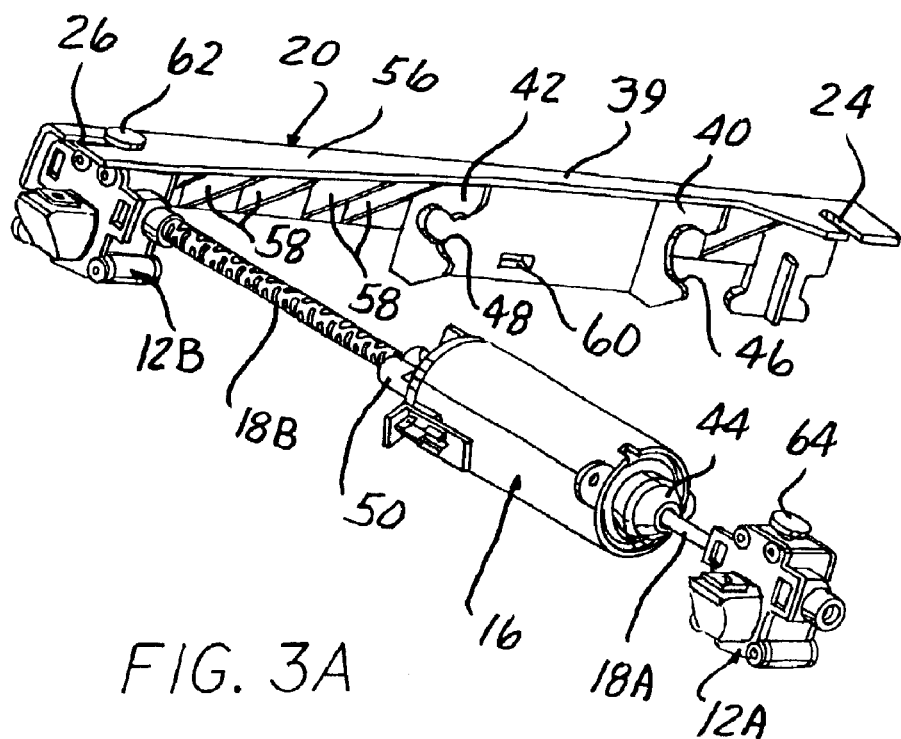
FIG. 3A is an enlarged perspective view at a lower line of sight of the bracket and other components shown in FIG. 3.

To carry out the assembly process, the bracket 20 is advanced towards gear unit 12B to engage the straight slot 26 with a headed pin 62 and the top of gear unit 12B (FIGS. 3 and 3A).

The bracket 20 is then swung about the pin 62 to cause the snap fit slot 24 to be engaged with headed pin 64, and snap fit thereto.

Simultaneously, flanges 40, 42 engage the motor features 50 to secure the motor 16 in alignment with both gear units 12A, 12B and also prevent axial shifting or rotation of the motor casing.

The bracket 20, motor 16, gear units 12A, 12B, and slide rails 10A, 10B are thus secured together into a subassembly.

Rather than using the flex cable type of drive shafts, another form of drive shaft can be used comprised of a plastic shaft 18B which has a series of tangential slots machined into the periphery thereof which creates a limited degree of flexibility sufficient to accommodate for the relatively slight misalignments between the gear unit 12B and the motor 16. Such a shaft is shown in U.S. patent application publication Ser. No. 2002/0074842A1. Thus, the difficulty in assembling flex cable drive shafts may be eliminated, and a quieter operation will also result.

Figure 6:
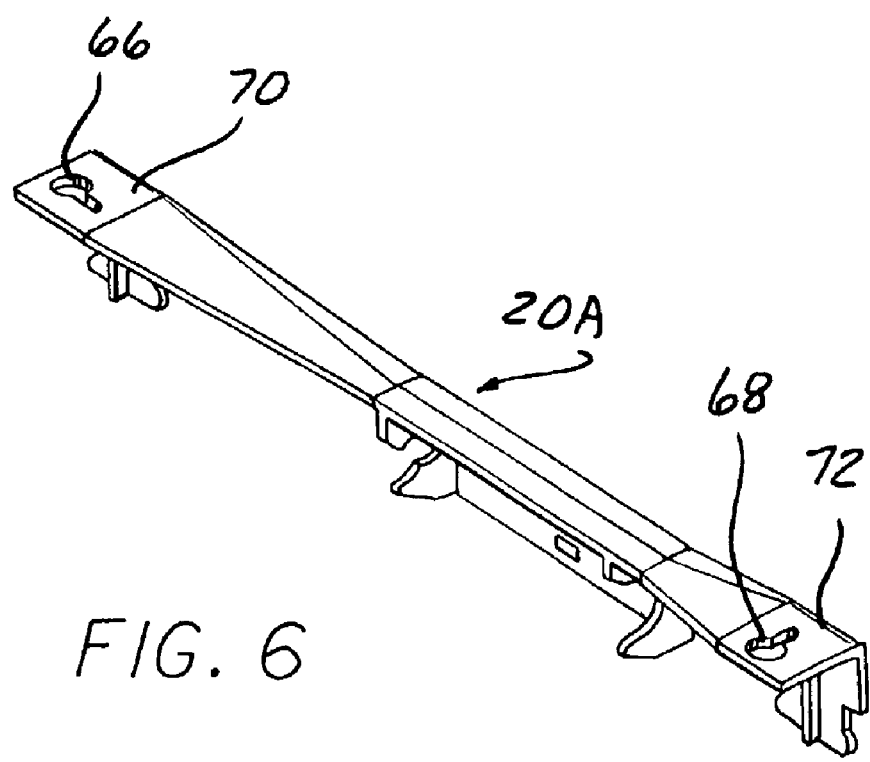
FIG. 6 is a perspective view of a bracket formed with an alternative form of slots in the end sections.

FIG. 6 shows an alternate embodiment of the bracket 20A in which key hole shaped slots 66 and 68 are formed in the respective top end sections 70, 72. This key hole slot shape may be stronger than the open ended slots 24, 26 of the first described embodiment since the slots do not extend completely out to the perimeter edge of the top sections 70, 72.

Figure 7:
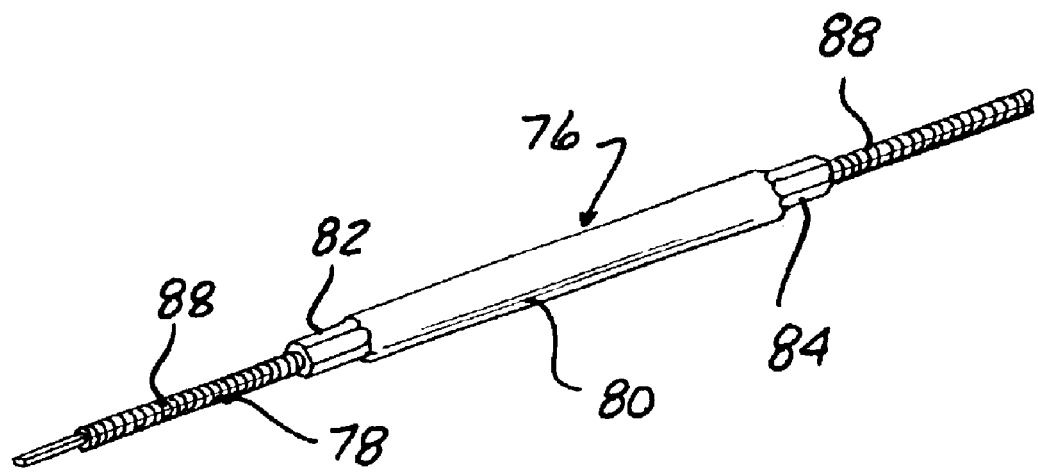
FIG. 7 is a perspective view of another form of flexible shaft.

FIG. 7 shows another suitable drive shaft 76 comprising a flex cable 78 having a stiff outer casing 80 crimped at either end 82, 84 to leave exposed shortened segments 86, 88 to reduce the sag otherwise present.

We claim:

1. A power seat drive arrangement comprising:
 a drive motor; a pair of side by side parallel power seat slide rail assemblies, said slide rail assemblies each including a right angle gear unit secured to one end thereof; an elongated bracket extending between said gear units and having an end section at each end thereof interfit with a feature on a respective gear unit, each of said end sections thereby detachably connected to a respective gear unit;
 said bracket including motor support structure located intermediate said end sections engaging a casing of said drive motor so as to support said drive motor in alignment with said gear units and prevent rotation thereof; and
 a drive shaft extending from each end of said drive motor into driving engagement with a respective gear unit.

2. The mounting arrangement according to claim 1 wherein one of said end sections has a slot extending in a lengthwise direction of said bracket, said slot engaged with a feature on said gear unit overlain by said one end section to be connected thereto, the other end section formed with a slot extending in a direction transverse to said lengthwise direction and engaged with a feature on said gear unit overlain by said other end section of said bracket to be connected thereto.

3. The mounting arrangement according to claim 2 wherein said slot extends transversely to said lengthwise direction and is configured to establish a snap fit connection to said feature engaged therewith.

4. The mounting arrangement according to claim 2 wherein said lengthwise extending slot extends out through said end section to be open at one end.

5. The mounting arrangement according to claim 2 wherein each of said slots are formed within the perimeter edge of the associated end section to be closed at either end.

6. The mounting arrangement according to claim 1 wherein said bracket motor support structure includes a first projecting tab formed with a cut out engaging said motor casing.

7. The mounting arrangement according to claim 6 wherein said first projecting tab engages one end of said motor and said motor supporting structure further includes a second projecting tab spaced from said first projecting tab having a cut out engaging an opposite end of said motor.

8. The mounting arrangement according to claim 7 wherein one of said cut outs is configured to have snap fit connection to a non-round antirotation feature on one of said motor ends.

9. The mounting arrangement according to claim 1 wherein said bracket is generally configured as an angled piece with a top wall and a side wall, said end sections forming a portion of said top wall.

10. The mounting arrangement according to claim 9 wherein said bracket has a series of gussets extending between said top wall and side wall.

11. The mounting arrangement according to claim 1 wherein at least one of said drive shafts is formed by a shaft having a series of peripheral slots formed therein.

12. The mounting arrangement according to claim 1 wherein at least one of said drive shafts comprises a flex cable and a casing enclosing said flex cable for only a portion of the length of said flex cable.

13. A method of assembling a drive motor to pair of power seat parallel slider rail assemblies, each having a right angle gear unit secured at one end thereof to be driven by said drive motor, said method comprising the steps of:

locating each of said slider rail assemblies spaced apart and parallel to each other with said gear units side by side with each other;

disposing said drive motor between said slider rail assemblies and aligned with said gear units;

installing drive shafts to either end of said drive motor and to a respective gear unit;

forming an elongated bracket sized to span the distance between said gear units and having respective end sections at either end thereof overlying each gear unit;

forming a first slot extending in a longitudinal direction in one end section and a second slot extending transversely in the other end section;

providing protruding a feature on each of said gear units extending out of a plane formed by said slider rails spaced and configured to be able to be received in a respective one of said first and second slots;

advancing said bracket towards said one end of one of said slider rails so as to receive one of said protruding feature into said first slot;

swinging said bracket about said protruding feature over to said one end of the other of said slider rails to pass the other of said protruding features into said second slot; and, securing said bracket in position with each of said protruding features with a respective one of said first and second slots.

14. The method according to claim 13 wherein said step of securing said bracket comprises the step of establishing a snap fit connection between said second slot and said one of said protruding feature received therein.

15. The method according to claim 13 further including the step of forming said bracket with a cut out engaging a non-round antirotation feature on said casing of said motor as said bracket is swung to engage one of said protruding feature with said second slot, said non-round feature preventing rotation of said motor casing with respect to said bracket.

16. The method according to claim 15 further including the step of forming an additional feature on said bracket engaging said motor casing as said bracket is swung to engage one of said protruding features with said second slot, said additional feature supporting said motor casing in alignment with said gear units.

* * * * *